United States Patent Office
2,748,010
Patented May 29, 1956

2,748,010

COMPOSITIONS COMPRISING REACTION PRODUCTS OF CELLULOSE THIOURETHANES AND ACRYLIC ACID DERIVATIVES

Arthur L. Allewelt, West Chester, Pa., assignor to American Viscose Corporation, Philadelphia, Pa., a corporation of Delaware No Drawing. Original application April 1, 1952, Serial No. 279,921. Divided and this application May 8, 1953, Serial No. 353,901

18 Claims. (Cl. 106—186)

This invention relates to compositions comprising thiourethanes of substituted-ethyl celluloses and to molded and extruded articles comprising them. This application is a division of my copending application Serial No. 279,921, filed April 1, 1952.

The new compositions of the invention comprise as an essential component an ether obtained from the interaction of a cellulose thiourethane with an acrylic acid derivative of the formula $CH_2=CHX$ in which X is the cyano group or the group $CONYY'$ in which Y and Y' represent hydrogen or alkyl radicals containing from 1 to 3 carbon atoms, whereby the cyanoethyl, amidoethyl, or alkyl-substituted amidoethyl ether is formed by the 1–4 addition of the acrylic acid derivative to the cellulose portion of the cellulose thiourethane.

In the products of the reaction between the cellulose thiourethane and acrylic acid derivative, some hydroxyl groups of the cellulose molecule are replaced by $-OCH_2CH_2X$ groups in which X is the same as defined hereinabove and by thiourethane groups

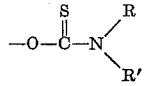

in which R and R' are each selected from the group consisting of hydrogen, a saturated or unsaturated aliphatic hydrocarbon radical containing from 1 to 12 carbon atoms, an alicyclic radical having a total of not more than 12 carbon atoms and comprising a single 4- to 6-membered carbocyclic ring, a heterocyclic radical having a total of not more than 12 carbon atoms and comprising a single 5- or 6-membered ring, an aryl radical of the benzene series, and an aryl radical of the benzene series having hydrocarbon groups containing a total of not more than six carbon atoms attached to the benzene ring, R and R' being the same or different. The term "cellulose" when used herein includes celluloses having any average molecular weight or degree of polymerization, such as a D. P. of 50 to 400 or more.

Representative compounds within the scope of the invention include the cyanoethyl-, 2-amidoethyl, N-alkyl-2-amidoethyl, and N,N-dialkyl-2-amidoethyl ethers of cellulose thiourethanes in which the thiourethane group is one of the following:

Thiourethane
Phenylthiourethane
Phenylethylthiourethane
Isopropylthiourethane
Amylthiourethane
Benzylthiourethane
Cyclohexylthiourethane
Octylthiourethane
Dibenzylthiourethane
Dibutylthiourethane
Diethylthiourethane
Pyridylthiourethane
Ethylthiourethane
Allylthiourethane
Methallylthiourethane
Pyrrolylthiourethane
Cyclobutylthiourethane While the ratios of the thiourethane groups and the substituted ethyl ether groups to the anhydroglucose units in the cellulose derivative may have wide ranges, in the preferred embodiments, the ratio of thiourethane groups to anhydroglucose units is from 1:2 to 1:10, most desirably 1:3 to 1:6 and the ratio of substituted ethyl ether groups to anhydroglucose units is from 0.75:1 to 1.75:1.

The cellulose thiourethanes which are reacted with the acrylic acid derivative to produce the ethers above may be prepared by any suitable method. They may result from the action of a primary or secondary amine on a xantho fatty acid obtained by reacting a cellulose xanthate with a monohalogenated acid, such as chloracetic acid. Preferably, however, the cellulose thiourethane is a colorless product obtained by reacting viscose with a salt of a di- or tri-valent metal, such as zinc sulfate, to form a metal complex which is then reacted with the primary or secondary amine, as described in my pending application Serial No. 65,742, filed December 16, 1948, and the disclosure thereof incorporated herein by reference. The ratio of thiourethane groups to anhydroglucose units may be from 1:2 to 1:10. Preferably, the cellulose thiourethane is soluble in dilute aqueous alkaline solution, and the reaction thereof with the acrylic derivative is carried out in an aqueous alkaline solution at temperatures below the polymerization temperature for the acrylic derivative.

Since the cyano-, amido-, and alkyl-substituted amido groups are hydrolyzable to the carboxyl group under alkaline conditions, the concentration of alkali in the reacting solution must be carefully controlled if partial or complete hydrolysis of those groups is to be avoided. The cellulose thiourethane and acrylic derivative are reacted in an aqueous solution of 1 to 4%, most desirably 2 to 3% of an alkali metal hydroxide such as sodium, lithium, or potassium hydroxide at a temperature varying inversely with the alkali concentration between 45 and 15° C., preferably 35 and 25° C., for a time varying with the alkali concentration and temperature between 2 and 8 hours, most desirably 4 and 6 hours, using from 10 to 55, preferably from 25 to 50 moles of acrylic derivative to one mole of cellulose thiourethane.

These thiourethanes of the cellulose ethers may be isolated from the reaction mass by neutralizing the alkali or by pouring the reaction solution into a precipitating liquid and occur as powdery or fibrous solids which are colorless or substantially colorless.

These ethers are characterized by excellent receptivity for both the acid wool and cellulose acetate type dyestuffs and exhibit plastic properties. They may be extruded as such or in mixtures with other plastic materials, to form fibers, films, tapes, tubes, ribbons, rods or other shaped articles which can be dyed very satisfactorily to deep fast shades under conventional wool-dyeing conditions. Thus, the cyanoethyl-, and amido- or alkyl-substituted amidoethyl cellulose thiourethanes may be heated, alone or in mixtures with other plastic material, to obtain a hot melt which can be extruded to form filaments, yarn, or unsupported films, or to provide a suitable substrate with a coating or film. For instance, the ethers may be melted in a heated cylinder or the like and pumped through a spinneret or other extruding device, or they may be fed into a conventional screw mixer-extruder and extruded as a cylindrical rod which is broken into small pieces and fed into a screw-extruder in which it is melted and forced through a spinneret to form filaments or through an adjustable slit-like orifice in the manner customarily employed in the continuous manufacture of pellicles or films.

These ethers are soluble in dimethylformamide and dimethylacetamide, and those in which the ratio of substituted-ethyl groups to anhydroglucose units is between 1:1 and 1.75:1 are also generally soluble in acetone. The thiourethane ethers may be dissolved in the solvents therefor and spun into filaments or yarns by the known wet- or dry-spinning processes. Or the solutions may be cast into films, used as coating compositions, as adhesives, or for laminating similar or dissimilar surfaces. The ethers may also be swollen or plasticized by means of acetone, dimethylformamide or dimethylacetamide to obtain plastic masses or "solid solutions" which may be extruded or molded, by controlling the amount of solvent used.

The ethers may be molded by compression or injection molding techniques, with or without the addition of molding adjuvants including fillers, plasticizing agents, dyes, pigments, special effect materials, mold lubricants, etc., and with or without preliminary shaping to convenient pellet form. Massive molded articles of diverse size and cross-section may be obtained and dyed with an acid dye under usual wool-dyeing conditions or with a cellulose acetate ("dispersol") type dye.

An important group of compositions of the present invention comprise the new thiourethanes of cellulose ethers as modifying or blending agents for plastic materials to impart dye receptivity to shaped articles formed from the blends. The ethers are compatible with such plastic fiber-forming and moldable materials as cellulose acetate and resins, of which the thermoplastic resins are particularly suitable, and may be blended with those base materials. Thus, a thiourethane of a cellulose ether within the scope of the invention may be mixed with commercial cellulose acetate and the mixture may be dissolved in a solvent for the ester and ether, or a thiourethane of the cellulose ether may be added to a "dope" comprising the cellulose acetate and a solvent for the ester and the thiourethane of the ether, prior to spinning, casing or otherwise shaping the dope. Dimethylformamide and dimethylacetamide, in which the ether-thiourethanes are soluble are also solvents for commercial cellulose acetate, and those solvents may be used in preparing spinning or casting solutions or "dopes" of the blends. When the solvent for the cellulose acetate is acetone, the acetone-soluble thiourethanes of the cellulose ethers are used in preparing the blends.

The thiourethanes of the cellulose ethers may also be mixed with natural or synthetic thermoplastic resins and extruded or molded by known methods. The components of these compositions may be mixed in solution and extruded or the dry, finely divided ingredients may be intimately mixed, for example in a Banbury mixer or on milling rolls, and dissolved in a suitable solvent. Or the dry mixture may be molded by compression or injection molding methods.

In molding the thiourethanes of the cellulose ethers or mixtures thereof with other plastic materials various molding adjuvants may be introduced into the molding composition, and when blends or mixtures of the cellulose ether thiourethanes with other plastic materials are used, the adjuvant, which may be a filler, plasticizer, mold lubricant, and/or special effect material, may be mixed with either of the primary components before they are mixed together or conjointly with compounding thereof.

Fillers which may be used in conjunction with molding compositions comprising the thiourethanes of the cellulose ethers include alpha-cellulose, wood flour, walnut shell flour, asbestos in the form of a powder or long or short fibers, finely divided silicon carbide, carbon black, diatomaceous earth, slate dust, powdered rutile, powdered or flake mica, powdered quartz, fibers and cloth cuttings (e. g. fibers or cloth cuttings of silk, rayon, wool, linen, cotton, nylon, glass, or polymeric or copolymeric acrylonitrile), ground cork, sand, etc.

Useful plasticizing agents include phthalic acid esters such as the dimethyl, diethyl, dimethyl glycol, diethyl glycol, dibutyl glycol and dioctyl phthalates, triethyl citrate, triacetin, benzyl benzoate and other known plasticizers for cellulose acetate and the synthetic thermoplastic resins.

As mold lubricants there may be used zinc stearate, calcium stearate, mixtures thereof, or natural or synthetic waxes.

Many thermoplastic or initially thermoplastic resins are compatible with and may be blended with the thiourethanes of cellulose ethers including the polyamides such as nylon, and polyesters, particularly polymethylene terephthalates, and the synthetic thermoplastic resins obtained by the polymerization or interpolymerization of one or more polymerizable monoethylenically unsaturated monomers. Examples of these resins are polystyrene, polyethylene, polymethacrylate, polyvinyl chloride, polyvinylidene chloride, copolymers of vinyl chloride and vinyl acetate, and copolymers of vinyl chloride and vinylidene chloride (e. g., the product available commercially under the tradename "Saran").

A specific group of synthetic resinous materials which may be blended with and modified by the thiourethanes of cellulose ethers are those acrylonitrile polymers containing, by weight in the polymer molecule, at least 50% of acrylonitrile. The polymer may be polyacrylonitrile or a copolymer of acrylonitrile with at least one other monoethylenically unsaturated monomer which is copolymerizable with acrylonitrile, those copolymers which are of thermoplastic character being especially valuable for molding purposes.

Monomers which may be copolymerized with acrylonitrile to produce binary or ternary copolymers for blending with the thiourethanes of the cellulose ethers include: acrylic, alpha-chloracrylic and methacrylic acids; methyl methacrylate, ethyl methacrylate, butyl methacrylate, octyl methacrylate, 2-nitro-2-methylpropyl methacrylate, methoxy-methacrylate, beta-chloroethyl methacrylate and the corresponding esters of acrylic and alpha-chloracrylic acids; vinyl chloride, vinyl fluoride, vinyl bromide; vinylidene chloride, 1-chloro-1-bromoethylene, vinylidene bromide, 1-fluoro-1-chlorethylene, 1,1-difluoroethylene; methacrylonitrile, alpha-chloracrylonitrile; acrylamide, methacrylamide, N-N-dimethyl-acrylamide, alpha-chloracrylamide or monoalkyl substitution products thereof; methyl vinyl ketone and methyl isopropyl ketone; vinyl carboxylates such as vinyl acetate, vinyl chloracetate, vinyl propionate and vinylstearate; N-vinylimides such as N-vinyl phthalimide and N-vinyl succinimide; methylene-malonic esters; itaconic acid and itaconic esters; trifluorethylene; N-vinyl carbazole and vinyl-substituted heterocyclic amines such as the vinylpyridines including those having hydrocarbon groups containing a total of not more than four carbon atoms attached to the pyridine nucleus, e. g., 2-vinylpyridine, 2-methyl-5-vinylpyridine, vinyl imidazoles, e. g., 1-vinylimidazole and N-vinylimidazole, 1-vinyl-2-methylimidazole, etc.; vinyl furane; butyl vinyl sulfone, ethyl vinyl sulfone; ethylene, propylene, isobutylene, butene-1 and butene-2; alkyl vinyl ethers; vinyl sulfonic acid; ethylene-alpha, beta-dicarboxylic acid or their anhydrides or derivatives such as diethyl fumarate, diethyl maleate, diethyl citraconate, diethyl mesaconate; styrene, vinyl-naphthalene and the like.

While the proportion of polymerized acrylonitrile in the base acrylonitrile polymer is at least 50%, it is frequently much higher depending on the ultimate use of the blend of polymer and thiourethane of cellulose ether. If the polymer is an acrylonitrile copolymer and the blend with the cellulose ether thiourethane is to be spun from a solution of the blend to form filaments or threads, the copolymer should contain at least 80% by weight of acrylonitrile in the molecule and not in excess of 20% by weight of the other monomer or monomers. Binary copolymers containing by weight in the polymer molecule from 80% to 99% acrylonitrile and 1% to 20% of another monomer, and ternary copolymers containing, by weight in the polymer molecule, 80% to 98% acrylonitrile and 1 to 19% each of two of the other monomers copolymerizable with acrylonitrile and in which the three components total 100%, are preferred for fiber-forming purposes.

The acrylonitrile polymers high in polymerized acrylonitrile content including polyacrylonitrile itself are soluble in dimethylformamide and dimethylacetamide. Since these solvents also dissolve the thiourethanes of cellulose ethers of the invention, they may be used in preparing spinning and casting solutions of the mixtures of acrylonitrile polymers and the thiourethanes.

The acrylonitrile polymers containing less than 80% by weight of acrylonitrile in the polymer molecule are not only soluble in dimethylformamide and dimethylacetamide but are also soluble in more common organic solvents, such as acetone, which do not dissolve the polymers of higher acrylonitrile content. Those thiourethanes of cellulose ethers which are soluble in acetone may be blended with the acetone-soluble acrylonitrile polymers and dissolved in acetone to obtain solutions which are cast into films, applied as coatings, and so forth.

The molecular weight of the thermoplastic resin mixed with the cellulose ether thiourethane may vary rather widely, depending on the use for which the blend or mixture is intended. Preferably, the resin has a molecular weight of at least 5,000, but when the composition comprises a blend of a cellulose ether thiourethane and a polymeric material containing at least 80% of polymerized acrylonitrile which is to be formed into filaments or yarns, higher molecular weights are desirable and the polymer may have a molecular weight up to 250,000 or even higher.

Although the cellulose ether thiourethanes can be blended with base materials which are more or less receptive to dyes, they are most valuable as blending or modifying agents for polymeric materials which are not dyed satisfactorily in baths containing the acetate dyes or wool type acid dyes, or which are not dyed satisfactorily by those dyes unless the bath contains special assistants the use of which complicates the dyeing operation and increases its cost.

The organic acid esters of cellulose, which are polymeric esters and exemplified by cellulose acetate, are hydrophobic materials not readily penetrated by water or aqueous media. The common method of dyeing articles formed from those esters with both acetate dyes and wool type acid dyes involves the use of baths containing an agent which swells or partially dissolves the cellulose ester to facilitate entry of the dyebath into the yarn or other article. Articles formed from blends of the cellulose organic acid esters with the thiourethanes of cellulose ethers can be dyed in aqueous baths containing the acetate dyes or acid wool type dyes in the absence of special swelling agents or partial solvents for the cellulose ester. Likewise, acrylonitrile polymers which do not accept the acid dyestuffs and are not colored to deep shades in baths containing the acetate dyes can be dyed under normal conditions in aqueous solutions or suspensions of those dyes if they are blended with the cellulose ether thiourethanes. In all cases, articles formed from blends of an acrylonitrile polymer and cellulose ether thiourethane were dyed to deeper, faster shades in aqueous baths containing a wool type acid dye or an acetate dye than control articles formed from the acrylonitrile polymer alone.

The dye receptivity of cellulose acetate and the thermoplastic resins can be modified by the use of the cellulose ether thiourethanes in amounts which do not result in any depreciation in the good tensile strength or other characteristic physical properties of filaments, yarns or other extruded or molded articles as compared to those properties of articles consisting of the cellulose esters or thermoplastic resins. In general, the cellulose ether thiourethane may be present in the blend in an amount of 2% to 25% on the weight of the blend.

The ethers and mixtures thereof with other at least initially thermoplastic materials exhibit good plastic flow during molding, and articles molded therefrom are clear, substantially colorless, and have a good surface appearance.

The following examples, in which the parts given are by weight unless otherwise specified, illustrate specific embodiments of the invention. The Rockwell hardness of the molded articles given was determined by means of the well-known Rockwell hardness tester.

*Example 1*

An ethyl thiourethane of cyanoethyl cellulose having one thiourethane group per 6.5 anhydroglucose units and 1.62 cyanoethyl groups per anhydroglucose unit was obtained by the procedure of Example 3 in my application Serial No. 279,921 supra. About 14 parts of a blend of 88 parts of a copolymer of 97% acrylonitrile and 3% vinyl acetate (sp. visc. 0.26) with 12 parts of the ethylthiourethane of cyanoethyl cellulose was dissolved in 86 parts of dimethylacetamide. The 14% solution was pumped at a speed of 12 ml./min. through a spinneret having 40 holes into a bath comprising 60% of dimethylacetamide and 40% of water at 50° C. The yarns thus formed were withdrawn from the bath after an immersion of 18 inches, withdrawn over a godet at a speed of 25 ft./min. and washed with water at 95° C. as they passed from the bath to the godet. The yarns were given a godet stretch of 150%, washed with water at 95° C. until the residual dimethylacetamide content was less than 2%, dried on steam-heated rolls at 100° C., and stretched 350% in an atmosphere of steam under a pressure of 60 lbs./sq. in.

The yarns could be dyed by cellulose acetate dyestuffs. In an aqueous bath containing 6% Celliton Fast Violet BA (Pr. #240) (ratio of bath to yarns 40:1) in which the yarns were held for one hour at 200° F., they dyed to a deeper shade than control yarns of the 97% acrylonitrile-3% vinyl acetate copolymer produced and aftertreated in the same manner. In a bath containing 6% Celliton Fast Black BTNA and under the same dyeing conditions, the yarns of the blend were dyed to a deeper shade than the control yarns.

*Example 2*

A dimethylthiourethane of cyanoethyl cellulose having one thiourethane group per 2.6 anhydroglucose units and 1.1 cyanoethyl groups per anhydroglucose unit was obtained by the procedure of Example 5 of my application Serial No. 279,921 supra. A 16% dimethylacetamide solution of a blend of 88 parts of a copolymer of 97% acrylonitrile and 3% vinyl acetate with 12 parts of the dimethylthiourethane of cyanoethyl cellulose was prepared. The solution was spun into yarns as in Example 1, except that the yarns were withdrawn from the bath at a speed of 32 ft./min. and stretched 100% simultaneously with washing thereof as they proceeded from the bath.

Different aqueous dyebaths were prepared containing 10% of sulfuric acid and, respectively, the acid dyestuffs as follows: 2% Crocein Scarlet MOO (C. I. No. 252), 2% Acid Dark Green A (C. I. No. 247), and 6% Wool Navy Blue 2B. Different batches of the yarns comprising the blends of acrylonitrile polymer and the dimethylthiourethane of cyanoethylcellulose were entered into the baths at 200° F. and held therein for one hour. Ratio of bath to yarns 40:1.

Different aqueous dyebaths were prepared containing, respectively, the following cellulose acetate dyestuffs: 2% Eastone Orange 3R, 4% Eastman Blue BNN (Pr. #288), 4% Celliton Fast Violet BA (Pr. #240), and 6% Celliton Fast Blue BRA (Pr. #233). Different batches of the yarns comprising the blend as described above were dyed in these baths at 200° F. for one hour. Ratio of bath to yarns 40:1.

*Example 3*

A pyridylthiourethane of cyanoethyl cellulose having one thiourethane group per four anhydroglucose units and 1.56 cyanoethyl groups per anhydroglucose unit was obtained by the procedure of Example 8 of Serial No. 279,921 supra. A 14% dimethylacetamide solution of a blend of 92 parts of a copolymer of 97% acrylonitrile and 3% vinyl acetate (specific viscosity 0.22 measured as 0.1 gm. in 100 ml. of dimethylformamide) and 8 parts of the pyridylthiourethane of cyanoethyl cellulose was prepared. The solution was cast to a film which was dyed with Wool Fast Scarlet G Supra (C. I. #252) in a bath prepared by dissolving 5% of Glaubers salt, 3% of sulfuric acid (96%) and 2% of the acid dye Wool Fast Scarlet G Supra (C. I. #252) percentages on the weight of the article to be dyed in water. The articles to be dyed were entered into the bath at 55° C., the bath was brought to the boil in 10 minutes, and boiled for 20 minutes. The dye acceptance of the blend film was considerably better than that of a control film of the acrylonitrile-vinyl acetate copolymer.

*Example 4*

A 14% dimethylacetamide solution of a blend of 92 parts of polyacrylonitrile and 8 parts of the pyridylthiourethane of cyanoethyl cellulose of Example 3 was prepared. It was cast to films which were dyed to a deeper shade of red in a bath as in Example 3 than a control film of the copolymer.

Other modifications and changes may also be made without departing from the spirit and scope of the invention as defined in the appended claims.

I claim:

1. A composition of matter comprising (1) a thiourethane of an ether cellulose in which some of the hydroxyl groups in the cellulose are replaced by thiourethane groups

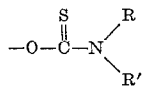

and by —OCH₂CH₂X in which X is selected from the class consisting of CN groups and CONYY' groups in which Y and Y' are each selected from the group consisting of hydrogen and alkyl radicals containing from 1 to 3 carbon atoms, and R and R' are each selected from the group consisting of hydrogen, saturated and unsaturated aliphatic hydrocarbon radicals containing from 1 to 8 carbon atoms, alicyclic radicals having a single 4- to 6-membered carbocyclic ring, heterocyclic nitrogen radicals having a single 5- to 6-membered ring, aryl radicals of the benzene series containing no hydrocarbon group attached to the benzene ring, and aryl radicals of the benzene series having hydrocarbon groups containing a total of not more than two carbon atoms attached to the benzene ring, and (2) another plastic material selected from the group consisting of cellulose esters, polymethylene terephthalates and polymers of monoethylenically unsaturated monomers.

2. A composition as defined in claim 1 in which the first-mentioned component of the composition is present in the amount of 2 to 25% by weight.

3. A composition as defined in claim 1 in which the other plastic material comprises cellulose acetate.

4. A composition as defined in claim 1 in which the other plastic material comprises a vinyl resin.

5. A composition as defined in claim 1 in which the other plastic material comprises polyacrylonitrile.

6. A composition as defined in claim 1 in which the other plastic material comprises a polymer of acrylonitrile containing at least 50% by weight of acrylonitrile.

7. A composition as defined in claim 1 in which the other plastic material comprises a copolymer of acrylonitrile containing at least 80% by weight of acrylonitrile.

8. A composition as defined in claim 1 in which the other plastic material comprises a copolymer of acrylonitrile containing 85 to 99% acrylonitrile and 1 to 15% of at least one other monoethylenically unsaturated monomer.

9. A composition as defined in claim 1 in which the other plastic material comprises a polystyrene.

10. A composition as defined in claim 1 in which the other plastic material comprises a copolymer of acrylonitrile and vinyl acetate.

11. A composition as defined in claim 1 in which the other plastic material comprises a copolymer of 97% acrylonitrile and 3% vinyl acetate.

12. A composition of matter comprising (1) a thiourethane of an ether of cellulose in which some of the hydroxyl groups in the cellulose are replaced by thiourethane groups $$-O-\overset{S}{\underset{\parallel}{C}}-N\diagdown\diagup\overset{R}{\underset{R'}{}}$$

and by —OCH₂CH₂X in which X is selected from the class consisting of CN groups and CONYY' groups in which Y and Y' are each selected from the group consisting of hydrogen and alkyl radicals containing from 1 to 3 carbon atoms, and R and R' are each selected from the group consisting of hydrogen, saturated and unsaturated aliphatic hydrocarbon radicals containing from 1 to 8 carbon atoms, alicyclic radicals having a single 4- to 6-membered carbocyclic ring, heterocyclic nitrogen radicals having a single 5- to 6-membered ring, aryl radicals of the benzene series containing no hydrocarbon group attached to the benzene ring, and aryl radicals of the benzene series having hydrocarbon groups containing a total of not more than two carbon atoms attached to the benzene ring, (2) another plastic material selected from the group consisting of cellulose esters, polymethylene terephthalates and polymers of monoethylenically unsaturated monomers, and (3) a solvent therefor.

13. A composition as defined in claim 12 in which the solvent is acetone.

14. A composition as defined in claim 12 in which the solvent is dimethylformamide.

15. A composition as defined in claim 12 in which the solvent is dimethylacetamide.

16. A composition of matter comprising acetone and a thiourethane of an ether of cellulose in which some of the hydroxyl groups in the cellulose are replaced by thiourethane groups $$-O-\overset{S}{\underset{\parallel}{C}}-N\diagdown\diagup\overset{R}{\underset{R'}{}}$$

and by —OCH₂CH₂X in which X is selected from the class consisting of CN groups and CONYY' groups in which Y and Y' are each selected from the group consisting of hydrogen and alkyl radicals containing from 1 to 3 carbon atoms, and R and R' are each selected from the group consisting of hydrogen, saturated and unsaturated aliphatic hydrocarbon radicals containing from 1 to 8 carbon atoms, alicylic radicals having a single 4- to 6-membered carbocyclic ring, heterocyclic nitrogen radicals having a single 5- to 6-membered ring, aryl radicals of the benzene series containing no hydrocarbon group attached to the benzene ring, and aryl radicals of the benzene series having hydrocarbon groups containing a total of not more than two carbon atoms attached to the benzene ring.

17. A composition of matter comprising dimethylformamide and a thiourethane of an ether of cellulose in which some of the hydroxyl groups in the cellulose are replaced by thiourethane groups

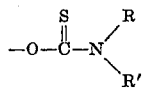

and by —OCH$_2$CH$_2$X in which X is selected from the class consisting of CN groups and CONYY' groups in which Y and Y' are each selected from the group consisting of hydrogen and alkyl radicals containing from 1 to 3 carbon atoms, and R and R' are each selected from the group consisting of hydrogen, saturated and unsaturated aliphatic hydrocarbon radicals containing from 1 to 8 carbon atoms, alicyclic radicals having a single 4- to 6-membered carbocyclic ring, heterocyclic nitrogen radicals having a single 5- to 6-membered ring, aryl radicals of the benzene series containing no hydrocarbon group attached to the benzene ring, and aryl radicals of the benzene series having hydrocarbon groups containing a total of not more than two carbon atoms attached to the benzene ring.

18. A composition of matter comprising dimethylacetamide and a thiourethane of an ether of cellulose in which some of the hydroxyl groups in the cellulose are replaced by thiourethane groups

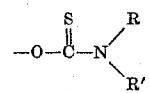

and by —OCH$_2$CH$_2$X in which X is selected from the class consisting of CN groups and CONYY' groups in which Y and Y' are each selected from the group consisting of hydrogen and alkyl radicals containing from 1 to 3 carbon atoms, and R and R' are each selected from the group consisting of hydrogen, saturated and unsaturated aliphatic hydrocarbon radicals containing from 1 to 8 carbon atoms, alicyclic radicals having a single 4- to 6-membered carbocyclic ring, heterocyclic nitrogen radicals having a single 5- to 6-membered ring, aryl radicals of the benzene series containing no hydrocarbon group attached to the benzene ring, and aryl radicals of the benzene series having hydrocarbon groups containing a total of not more than two carbon atoms attached to the benzene ring.

No references cited.